United States Patent

Suzuki et al.

[15] 3,700,953

[45] Oct. 24, 1972

[54] IMAGE DISSECTOR TUBE

[72] Inventors: Yoshiji Suzuki, Shizuoka; Ikuo Hayashi, Hamamatsu; Kazuo Kurasawa, Hamamatsu; Mitsuhiro Shimada, Hamamatsu, all of Japan

[73] Assignee: Hamamatsu TV Company Limited, Prefecture, Japan

[22] Filed: April 28, 1969

[21] Appl. No.: 819,889

[30] Foreign Application Priority Data

April 30, 1968 Japan ......................43/34840

[52] U.S. Cl. ................................................315/11

[51] Int. Cl. ..............................................H01j 31/48

[58] Field of Search ..................................315/10, 11

[56] References Cited

UNITED STATES PATENTS

| | | | |
|---|---|---|---|
| 3,441,786 | 4/1969 | Clayton | ..................315/12 X |
| 3,041,947 | 7/1962 | Molock et al. | ............315/10 X |

*Primary Examiner*—Richard A. Farley
*Assistant Examiner*—Brian L. Ribando
*Attorney*—Laurence R. Brown

[57] ABSTRACT

The present disclosure is directed to an image dissector tube having an image forming and scanning section and an electron multiplier section in which a control electrode is provided between said sections so as to apply a blanking voltage synchronously with a retrace period to cut off the beam and thereby present a black background level during the retrace period of the signal produced by the image dissector tube.

1 Claim, 3 Drawing Figures

INVENTORS
Yoshiji Suzuki
Ikuo Hayashi
Kazuo Kurasawa
Mitsuhiro Shimada
BY Laurence R. Brown
Attorney

IMAGE DISSECTOR TUBE

This invention relates to image dissector tubes.

In the conventional image dissector tubes, when picking up a television image, an electron current passed through a scanning aperture is amplified with a secondary electron multiplier to send out an output signal even in the horizontal and vertical retrace periods. Since this signal has a level corresponding to the brightness of a portion of image passed through the retrace period, if an output picture signal of the dissector tube is amplified and applied to a picture tube through a D.C. restorer, the reference video d.c. of each horizontal scanning line will be a function of the level in each retrace period. Thus a high fidelity image will not be regenerated.

An object of the present invention is to provide an image dissector tube which is provided therein with a control electrode to which a blanking pulse is applied, thereby preventing the fluctuation of the reference level of the scanning lines and regenerating an image of high fidelity.

Now, the present invention shall be explained with reference to the accompanying drawings, in which.

Figure 1:
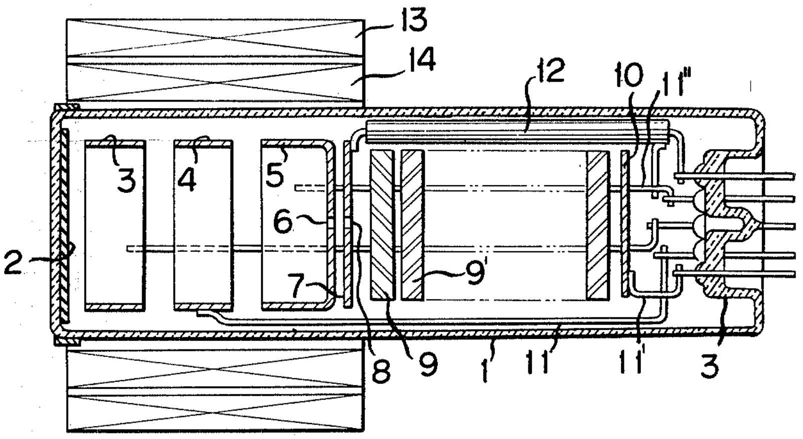
FIG. 1 is a vertical sectional view showing an embodiment of an image dissector tube according to the present invention.
Figure 2:
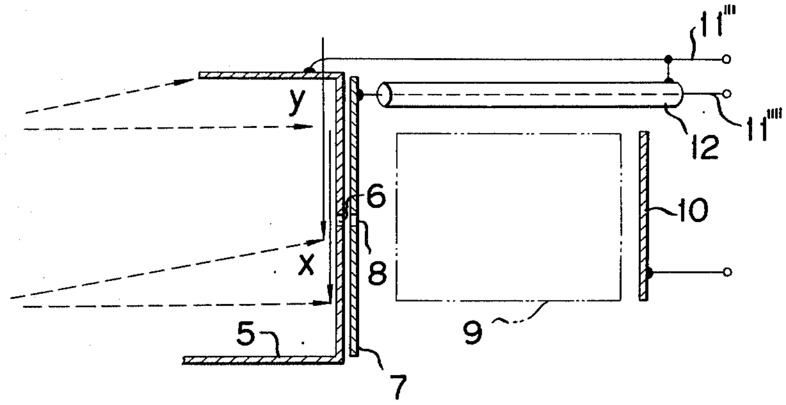
FIG. 2 is a schematic view partly in section showing the structure of electrode which is a principal part in the tube shown in FIG. 1.

FIG. 1 shows an embodiment of the present invention, in which a photoelectric cathode 2 is formed at an end of a cylindrical airtight casing 1 made of glass, the other end of which is sealed with a stem 3. Cylindrical accelerating electrodes 3 and 4 and an anode 5, which is an electronic image forming part, are arranged opposite the photoelectric cathode 2. The anode 5 is provided at its center with a very small scanning aperture 6 for taking out a signal electron current. According to the present invention a disc-shaped control electrode 7 is disposed in the rear of the anode 5. The control electrode 7 is provided at its center with an electron current passing aperture 8 to be registered with the scanning aperture 6. In the rear of the control electrode 7 is disposed a secondary electron multiplier section consisting of a plurality of electrodes 9, 9' etc., terminating in an output electrode 10. The electrodes are connected to the lead-in wires of the stem 3 through lead wires 11, 11' etc., respectively. Specially, the lead wire of the control electrode 7 is fitted in a shielding pipe 12, which is connected to the lead wire of the anode 5 (FIG. 2). In the image forming part of the image dissector tube a focusing coil 13 and a deflecting coil 14 are used.

That is to say, when an optical image is projected to the photoelectric cathode 2 by an optical lens system, the electron current emitted from this cathode corresponding to the brightness of the optical image is accelerated by the electrodes 3, 4 and 5 and focused by the focusing coil 13 to form on the anode 5 an electronic image corresponding to the above mentioned optical image. Furthermore, when horizontal and vertical deflecting inputs are applied to the deflecting coil 14, the electronic image moves horizontally and vertically on the anode 5. For example, the electronic image at a position indicated by an arrow *x* in FIG. 2 moves by the deflection to a position indicated by an arrow *y*. For this purpose the electron current of a magnitude corresponding to the brightness at each position of the optical image is subsequently taken out from the scanning aperture 6. This electron current, then, passes through the aperture 8 of the control electrode and is amplified by the secondary electron multiplier section consisting of the electrodes 9, 9' etc. to be collected by the output electrode 10. Therefore, if the output current of this electrode 10 is further amplified, the optical image can be reproduced on a screen of a picture tube.

Figure 3:
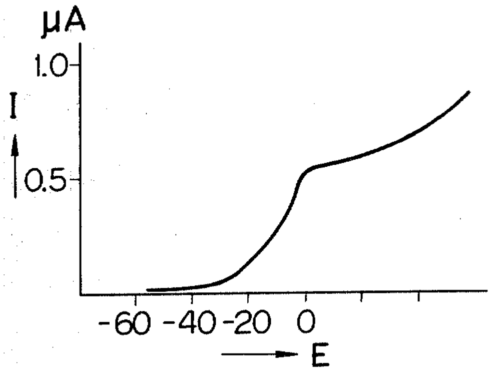
FIG. 3 is a diagram showing a characteristic curve of the image dissector tube shown in FIG. 1.

In the apparatus described in the above, if the voltage E of the control electrode 7 is made negative as shown in FIG. 3, the current I taken out from the output electrode 10 will begin to be rapidly lowered and when it is lower than about −30 volts, the above output current will be almost extinguished. Accordingly, if the control electrode 7 is maintained normally at approximately the same electric potential as of the photoelectric cathode 2 and a pulse voltage of about −30 volts is applied to said control electrode during the retrace period of the horizontal and vertical deflecting inputs to be applied to the deflecting coil 14, the output of the electrode 10 in the retrace period can be made zero. In other words, if such a blanking voltage is applied to the control electrode 7 during the horizontal and vertical retrace period, a level of image signal in the retrace period will become a completely black level. Therefore, when an output image signal of the electrode 10 is applied to the picture tube through the process amplifier and DC restorer, there is no fear of fluctuating the reference level at every scanning line to cause an unevenness in the brightness, whereby an image of high fidelity can be reproduced.

If the lead wire 11'''' of the control electrode 7 is fitted in the shielding pipe 12 and the pipe 12 is connected to the electrode 5 by lead 11''' (FIG. 2) and other proper electrodes which are earthed for alternating current, it will be possible to prevent the blanking pulse voltage applied to said electrode 7 from being induced to the electrode 9 of the secondary electron multiplier. Therefore, fear that distortion occurs in the image signal during the scanning period due to a wave form distortion by the above mentioned blanking pulse induced voltage can be eliminated.

We claim:

1. In an image dissector tube comprising an image forming and scanning section terminating in an anode having a scanning aperture disposed therein to pass an electronic current representative of the brightness of an image at a single position through said image forming section into said electron multiplier section for amplifying the current passing through said anode to an output electrode, the improvement for blanking retraces without fluctuating reference levels comprising, an electron current controlling retrace blanking electrode arranged with a current passing aperture in registration with the scanning aperture of said anode located between said image forming and scanning section and said electron multiplier section with said controlling electrode having a characteristic that permits the electronic current passing through said anode to be substantially cut off with a retrace blanking signal.

* * * * *